(12) United States Patent
Sridharan et al.

(10) Patent No.: US 11,595,092 B2
(45) Date of Patent: Feb. 28, 2023

(54) SIGNAL CANCELLATION IN RADIO FREQUENCY (RF) DEVICE NETWORK

(71) Applicant: Movandi Corporation, Irvine, CA (US)

(72) Inventors: Kartik Sridharan, San Diego, CA (US); Ahmadreza Rofougaran, Newport Beach, CA (US); Michael Boers, South Turramurra (AU); Seunghwan Yoon, Irvine, CA (US); Sam Gharavi, Irvine, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

(21) Appl. No.: 16/927,225

(22) Filed: Jul. 13, 2020

(65) Prior Publication Data

US 2020/0343953 A1 Oct. 29, 2020

Related U.S. Application Data

(63) Continuation of application No. 15/836,198, filed on Dec. 8, 2017.

(51) Int. Cl.
*H04B 7/06* (2006.01)
*H01Q 19/19* (2006.01)
(Continued)

(52) U.S. Cl.
CPC .......... *H04B 7/0617* (2013.01); *H01Q 1/523* (2013.01); *H01Q 3/46* (2013.01); *H01Q 19/192* (2013.01);
(Continued)

(58) Field of Classification Search
CPC ........ H04B 7/0617; H04B 1/10; H01Q 1/523; H01Q 3/46; H01Q 19/192; H01Q 19/195;
(Continued)

(56) References Cited

U.S. PATENT DOCUMENTS

| 3,835,469 A | 9/1974 | Chen et al. |
| 4,799,062 A | 1/1989 | Sanderford et al. |

(Continued)

FOREIGN PATENT DOCUMENTS

WO 2008027531 A3 12/2008

OTHER PUBLICATIONS

Corrected Notice of Allowance for U.S. Appl. No. 16/125,757 dated Jul. 16, 2021.
(Continued)

*Primary Examiner* — Andrea Lindgren Baltzell
*Assistant Examiner* — Yonchan J Kim
(74) *Attorney, Agent, or Firm* — Chip Law Group

(57) ABSTRACT

A system, in a programmable active reflector (AR) device associated with a first radio frequency (RF) device and a second RF device, receives a request and associated metadata from the second RF device via a first antenna array. Based on the received request and associated metadata, one or more antenna control signals are received from the first RF device. The programmable AR device is dynamically selected and controlled by the first RF device based on a set of criteria. A controlled plurality of RF signals is transmitted, via a second antenna array, to the second RF device within a transmission range of the programmable AR device based on the associated metadata. The controlled plurality of RF signals are cancelled at the second RF device based on the associated metadata.

17 Claims, 5 Drawing Sheets

(51) Int. Cl.
| | |
|---|---|
| *H01Q 19/195* | (2006.01) |
| *H01Q 1/52* | (2006.01) |
| *H01Q 3/46* | (2006.01) |
| *H01Q 19/10* | (2006.01) |
| *H01Q 15/24* | (2006.01) |
| *H01Q 15/14* | (2006.01) |

(52) U.S. Cl.
CPC ......... *H01Q 19/195* (2013.01); *H01Q 15/147* (2013.01); *H01Q 15/248* (2013.01); *H01Q 19/104* (2013.01)

(58) Field of Classification Search
CPC ... H01Q 15/147; H01Q 15/248; H01Q 19/104
USPC .................................................. 455/36.1, 7
See application file for complete search history.

(56) References Cited

U.S. PATENT DOCUMENTS

| | | | |
|---|---|---|---|
| 5,479,651 A | 12/1995 | Nakaguchi | |
| 5,724,337 A | 3/1998 | Kawano et al. | |
| 5,883,602 A | 3/1999 | Volman | |
| 6,731,904 B1* | 5/2004 | Judd | H01Q 21/28 455/13.1 |
| 7,079,079 B2 | 7/2006 | Jo et al. | |
| 7,480,486 B1 | 1/2009 | Oh et al. | |
| 7,675,465 B2 | 3/2010 | Doan et al. | |
| 7,715,466 B1* | 5/2010 | Oh | H04B 7/022 375/140 |
| 8,045,638 B2 | 10/2011 | Grant et al. | |
| 9,130,262 B2 | 9/2015 | Park et al. | |
| 9,178,546 B1* | 11/2015 | Klemes | H04B 1/10 |
| 9,277,510 B2 | 3/2016 | Helmersson et al. | |
| 10,080,274 B2 | 9/2018 | Johnson | |
| 10,103,853 B2 | 10/2018 | Moshfeghi | |
| 10,199,717 B2 | 2/2019 | Rofougaran et al. | |
| 10,277,370 B2 | 4/2019 | Moshfeghi | |
| 10,320,090 B2 | 6/2019 | Zou et al. | |
| 10,355,720 B2 | 7/2019 | Shattil | |
| 10,389,041 B2 | 8/2019 | Yoon et al. | |
| 10,560,179 B2 | 2/2020 | Gharavi et al. | |
| 10,854,995 B2 | 12/2020 | Rofougaran et al. | |
| 10,965,411 B2 | 3/2021 | Moshfeghi | |
| 11,018,816 B2 | 5/2021 | Moshfeghi | |
| 11,056,764 B2 | 7/2021 | Rofougaran et al. | |
| 11,075,724 B2 | 7/2021 | Moshfeghi | |
| 11,088,756 B2 | 8/2021 | Gharavi et al. | |
| 11,128,415 B2 | 9/2021 | Moshfeghi | |
| 11,342,968 B2 | 5/2022 | Yoon et al. | |
| 11,394,128 B2 | 7/2022 | Rofougaran et al. | |
| 2004/0204114 A1 | 10/2004 | Brennan et al. | |
| 2005/0088260 A1 | 4/2005 | Ajioka et al. | |
| 2005/0136943 A1* | 6/2005 | Banerjee | H04B 17/21 375/E1.032 |
| 2006/0040615 A1 | 2/2006 | Mohamadi | |
| 2006/0063487 A1 | 3/2006 | Cleveland et al. | |
| 2006/0170595 A1 | 8/2006 | Gustaf | |
| 2006/0205342 A1 | 9/2006 | McKay et al. | |
| 2007/0115800 A1 | 5/2007 | Fonseka et al. | |
| 2007/0127360 A1 | 6/2007 | Song et al. | |
| 2008/0207259 A1 | 8/2008 | Rofougaran | |
| 2009/0046624 A1 | 2/2009 | Martinez et al. | |
| 2009/0066590 A1 | 3/2009 | Yamada et al. | |
| 2009/0092120 A1 | 4/2009 | Goto et al. | |
| 2009/0136227 A1 | 5/2009 | Lambert | |
| 2009/0156227 A1 | 6/2009 | Frerking et al. | |
| 2009/0175214 A1 | 7/2009 | Star et al. | |
| 2009/0191910 A1 | 7/2009 | Athalye et al. | |
| 2010/0159859 A1 | 6/2010 | Rofougaran | |
| 2010/0167639 A1 | 7/2010 | Ranson et al. | |
| 2010/0265925 A1 | 10/2010 | Liu et al. | |
| 2010/0267415 A1 | 10/2010 | Kakitsu et al. | |
| 2010/0284446 A1 | 11/2010 | Mu et al. | |
| 2011/0190005 A1 | 8/2011 | Cheon et al. | |
| 2011/0294415 A1* | 12/2011 | Jeon | H04B 7/2606 455/7 |
| 2012/0003925 A1* | 1/2012 | Coldrey | H04B 7/1555 455/7 |
| 2012/0149300 A1 | 6/2012 | Forster | |
| 2012/0224651 A1 | 9/2012 | Murakami et al. | |
| 2013/0003645 A1 | 1/2013 | Shapira et al. | |
| 2013/0034128 A1 | 2/2013 | Gore et al. | |
| 2013/0039342 A1 | 2/2013 | Kazmi | |
| 2013/0072112 A1 | 3/2013 | Gunnarsson et al. | |
| 2013/0072113 A1 | 3/2013 | Lee et al. | |
| 2013/0122802 A1 | 5/2013 | Wang et al. | |
| 2013/0149300 A1 | 6/2013 | Hiatt et al. | |
| 2014/0077875 A1 | 3/2014 | Wang et al. | |
| 2014/0079165 A1 | 3/2014 | Kludt et al. | |
| 2014/0104124 A1 | 4/2014 | Chernokalov et al. | |
| 2015/0296344 A1 | 10/2015 | Trojer et al. | |
| 2016/0049723 A1 | 2/2016 | Baks et al. | |
| 2016/0056946 A1 | 2/2016 | Moher | |
| 2016/0204513 A1 | 7/2016 | Yemelong et al. | |
| 2016/0359230 A1 | 12/2016 | Wang et al. | |
| 2017/0062944 A1 | 3/2017 | Zimmerman et al. | |
| 2017/0324171 A1 | 11/2017 | Shehan | |
| 2018/0027471 A1 | 1/2018 | Zhang et al. | |
| 2018/0063139 A1 | 3/2018 | Day et al. | |
| 2018/0109303 A1 | 4/2018 | Yoo et al. | |
| 2018/0176799 A1 | 6/2018 | Lange et al. | |
| 2018/0183152 A1 | 6/2018 | Turpin et al. | |
| 2018/0231651 A1 | 8/2018 | Charvat | |
| 2018/0269576 A1 | 9/2018 | Scarborough et al. | |
| 2018/0316090 A1 | 11/2018 | Foo | |
| 2019/0020399 A1 | 1/2019 | Coutts | |
| 2019/0020402 A1 | 1/2019 | Gharavi et al. | |
| 2019/0089069 A1 | 3/2019 | Niroo et al. | |
| 2019/0123866 A1 | 4/2019 | Moshfeghi | |
| 2019/0139914 A1 | 5/2019 | Kirino et al. | |
| 2019/0297648 A1 | 9/2019 | Nagaraja et al. | |
| 2019/0319756 A1 | 10/2019 | Moshfeghi | |
| 2020/0036414 A1 | 1/2020 | Shattil | |
| 2020/0076491 A1 | 3/2020 | Zhang et al. | |
| 2020/0145079 A1 | 5/2020 | Marinier et al. | |
| 2020/0185299 A1 | 6/2020 | Chang et al. | |
| 2020/0204249 A1 | 6/2020 | Pyun | |
| 2020/0322016 A1 | 10/2020 | Kim et al. | |
| 2020/0412519 A1 | 12/2020 | Krishnaswamy et al. | |
| 2021/0109145 A1 | 4/2021 | Haustein et al. | |

OTHER PUBLICATIONS

Corrected Notice of Allowance for U.S. Appl. No. 16/125,757 dated Jun. 28, 2021.

Corrected Notice of Allowance for U.S. Appl. No. 16/204,397 dated Apr. 28, 2021.

Corrected Notice of Allowance for U.S. Appl. No. 16/204,397 dated Jun. 7, 2021.

Corrected Notice of Allowance for U.S. Appl. No. 16/233,044 dated Jun. 11, 2021.

Corrected Notice of Allowance for U.S. Appl. No. 16/354,390 dated Jul. 13, 2021.

Corrected Notice of Allowance for U.S. Appl. No. 16/354,390 dated Jun. 3, 2021.

Corrected Notice of Allowance for U.S. Appl. No. 16/364,956 dated Jun. 23, 2021.

Corrected Notice of Allowance for U.S. Appl. No. 16/364,956 dated May 6, 2021.

Corrected Notice of Allowance for U.S. Appl. No. 16/377,847 dated Jul. 13, 2021.

Corrected Notice of Allowance for U.S. Appl. No. 16/377,847 dated Jul. 6, 2021.

Corrected Notice of Allowance for U.S. Appl. No. 16/391,628 dated Jun. 29, 2021.

Corrected Notice of Allowance for U.S. Appl. No. 16/689,758 dated Apr. 29, 2021.

Corrected Notice of Allowance for U.S. Appl. No. 16/689,758 dated Jul. 6, 2021.

(56) References Cited

OTHER PUBLICATIONS

Corrected Notice of Allowance for U.S. Appl. No. 16/689,758 dated May 27, 2021.
Corrected Notice of Allowance for U.S. Appl. No. 16/866,536 dated Apr. 29, 2021.
Corrected Notice of Allowance for U.S. Appl. No. 16/927,470 dated Apr. 26, 2021.
Final Office Action for U.S. Appl. No. 17/011,042 dated Jul. 2, 2021.
Non-Final Office Action for U.S. Appl. No. 17/091,520 dated Jul. 8, 2021.
Notice of Allowability for U.S. Appl. No. 16/819,388 dated Apr. 28, 2021.
Notice of Allowability for U.S. Appl. No. 16/819,388 dated May 27, 2021.
Notice of Allowance for U.S. Appl. No. 16/233,044 dated Jun. 4, 2021.
Notice of Allowance for U.S. Appl. No. 16/388,043 dated May 7, 2021.
Notice of Allowance for U.S. Appl. No. 16/398,156 dated Jul. 6, 2021.
Notice of Allowance for U.S. Appl. No. 16/941,690 dated May 5, 2021.
Supplemental Notice of Allowance for U.S. Appl. No. 16/451,980 dated Jun. 30, 2021.
Supplemental Notice of Allowance for U.S. Appl. No. 16/451,980 dated May 18, 2021.
Supplemental Notice of Allowance for U.S. Appl. No. 16/451,998 dated Jun. 24, 2021.
Supplemental Notice of Allowance for U.S. Appl. No. 16/451,998 dated May 18, 2021.
Supplemental Notice of Allowance for U.S. Appl. No. 16/452,023 dated Apr. 30, 2021.
Supplemental Notice of Allowance for U.S. Appl. No. 16/666,680 dated Jul. 9, 2021.
Supplemental Notice of Allowance for U.S. Appl. No. 16/666,680 dated Jun. 10, 2021.
Supplemental Notice of Allowance for U.S. Appl. No. 16/866,536 dated Jul. 21, 2021.
Supplemental Notice of Allowance for U.S. Appl. No. 16/866,536 dated Jun. 7, 2021.
Supplemental Notice of Allowance for U.S. Appl. No. 16/941,690 dated May 18, 2021.
Corrected Notice of Allowability for U.S. Appl. No. 16/125,757 dated Mar. 11, 2021.
Corrected Notice of Allowability for U.S. Appl. No. 16/204,397 dated Mar. 11, 2021.
Corrected Notice of Allowance for U.S. Appl. No. 16/125,757 dated Feb. 1, 2021.
Corrected Notice of Allowance for U.S. Appl. No. 16/354,390 dated Apr. 9, 2021.
Corrected Notice of Allowance for U.S. Appl. No. 16/388,043 dated Apr. 15, 2021.
Corrected Notice of Allowance for U.S. Appl. No. 16/689,758 dated Apr. 7, 2021.
Corrected Notice of Allowance for U.S. Appl. No. 16/927,470 dated Feb. 2, 2021.
Corrected Notice of Allowance for U.S. Appl. No. 16/927,470 dated Jan. 26, 2021.
Corrected Notice of Allowance for U.S. Appl. No. 16/388,043 dated Feb. 8, 2021.
Final Office Action for U.S. Appl. No. 16/233,044 dated Apr. 19, 2021.
Final Office Action for U.S. Appl. No. 16/398,156 dated Apr. 19, 2021.
International Preliminary Report on Patentability for International Application No. PCT/US2018/064184 dated Jan. 21, 2021.
Morgan et al., "A Same-Frequency Cellular Repeater Using Adaptive Feedback Cancellation," IEEE, Mar. 12, 2012, pp. 3825-3830.
Non-Final Office Action for U.S. Appl. No. 17/011,042 dated Mar. 23, 2021.
Notice of Allowability for U.S. Appl. No. 16/129,413 dated Feb. 18, 2021.
Notice of Allowability for U.S. Appl. No. 16/388,043 dated Mar. 11, 2021.
Notice of Allowability for U.S. Appl. No. 16/819,388 dated Apr. 5, 2021.
Notice of Allowance for U.S. Appl. No. 16/354,390 dated Feb. 25, 2021.
Notice of Allowance for U.S. Appl. No. 16/377,847 dated Apr. 5, 2021.
Notice of Allowance for U.S. Appl. No. 16/391,628 dated Mar. 17, 2021.
Notice of Allowance for U.S. Appl. No. 16/451,980 dated Mar. 23, 2021.
Notice of Allowance for U.S. Appl. No. 16/451,998 dated Jan. 14, 2021.
Notice of Allowance for U.S. Appl. No. 16/666,680 dated Mar. 2, 2021.
Notice of Allowance for U.S. Appl. No. 16/689,758 dated Jan. 22, 2021.
Notice of Allowance for U.S. Appl. No. 16/819,388 dated Jan. 25, 2021.
Notice of Allowance for U.S. Appl. No. 16/866,536 dated Jan. 29, 2021.
Supplemental Notice of Allowance for U.S. Appl. No. 16/452,023 dated Feb. 18, 2021.
Supplemental Notice of Allowance for U.S. Appl. No. 16/153,735 dated Feb. 24, 2021.
Supplemental Notice of Allowance for U.S. Appl. No. 16/451,998 dated Mar. 2, 2021.
Supplemental Notice of Allowance for U.S. Appl. No. 16/866,536 dated Mar. 17, 2021.
Corrected Notice of Allowability for U.S. Appl. No. 16/377,980 dated Jul. 22, 2020.
Corrected Notice of Allowability for U.S. Appl. No. 16/526,544 dated Jul. 16, 2020.
Corrected Notice of Allowance for U.S. Appl. No. 16/526,544 dated Aug. 25, 2020.
Corrected Notice of Allowance for U.S. Appl. No. 15/836,198 dated Oct. 2, 2020.
Corrected Notice of Allowance for U.S. Appl. No. 16/377,980 dated Oct. 5, 2020.
Corrected Notice of Allowance for U.S. Appl. No. 16/526,544 dated Sep. 25, 2020.
Final Office Action for U.S. Appl. No. 16/125,757 dated Jul. 15, 2020.
Final Office Action for U.S. Appl. No. 16/364,956 dated Oct. 2, 2020.
Non-Final Office Action for U.S. Appl. No. 16/204,397 dated Sep. 17, 2020.
Non-Final Office Action for U.S. Appl. No. 16/388,043 dated Aug. 3, 2020.
Non-Final Office Action for U.S. Appl. No. 16/451,998 dated Sep. 11, 2020.
Non-Final Office Action for U.S. Appl. No. 16/452,023 dated Sep. 9, 2020.
Non-Final Office Action for U.S. Appl. No. 16/461,980 dated Sep. 21, 2020.
Non-Final Office Action for U.S. Appl. No. 16/689,758 dated Sep. 29, 2020.
Non-Final Office Action for U.S. Appl. No. 16/866,536 dated Sep. 1, 2020.
Notice of Allowance for U.S. Appl. No. 16/129,413 dated Aug. 12, 2020.
Supplemental Notice of Allowability for U.S. Appl. No. 16/153,735 dated Jul. 22, 2020.
Supplemental Notice of Allowance for U.S. Appl. No. 16/153,735 dated Oct. 9, 2020.
Notice of Allowability for U.S. Appl. No. 16/129,413 dated Jan. 6, 2021.

(56) References Cited

OTHER PUBLICATIONS

Corrected Notice of Allowability for U.S. Appl. No. 16/684,789 dated Jan. 11, 2021.
Corrected Notice of Allowance for U.S. Appl. No. 15/256,222 dated Oct. 28, 2020.
Corrected Notice of Allowance for U.S. Appl. No. 16/125,757 dated Dec. 31, 2020.
Corrected Notice of Allowance for U.S. Appl. No. 16/129,413 dated Nov. 27, 2020.
Corrected Notice of Allowance for U.S. Appl. No. 16/153,735 dated Nov. 18, 2020.
Corrected Notice of Allowance for U.S. Appl. No. 16/364,956 dated Jan. 6, 2021.
Corrected Notice of Allowance for U.S. Appl. No. 16/388,043 dated Dec. 24, 2020.
Corrected Notice of Allowance for U.S. Appl. No. 16/388,043 dated Dec. 30, 2020.
Corrected Notice of Allowance for U.S. Appl. No. 16/675,290 dated Dec. 16, 2020.
Corrected Notice of Allowance for U.S. Appl. No. 16/684,789 dated Nov. 20, 2020.
Non-Final Office Action for U.S. Appl. No. 16/233,044 dated Oct. 14, 2020.
Non-Final Office Action for U.S. Appl. No. 16/377,847 dated Dec. 14, 2020.
Non-Final Office Action for U.S. Appl. No. 16/398,156 dated Oct. 15, 2020.
Non-Final Office Action for U.S. Appl. No. 16/666,680 dated Nov. 13, 2020.
Non-Final Office Action for U.S. Appl. No. 16/941,690 dated Nov. 12, 2020.
Notice of Allowability for U.S. Appl. No. 15/607,750 dated Jan. 11, 2021.
Notice of Allowability for U.S. Appl. No. 16/129,413 dated Nov. 9, 2020.
Notice of Allowance for U.S. Appl. No. 16/125,757 dated Oct. 28, 2020.
Notice of Allowance for U.S. Appl. No. 16/204,397 dated Jan. 12, 2021.
Notice of Allowance for U.S. Appl. No. 16/364,956 dated Dec. 11, 2020.
Notice of Allowance for U.S. Appl. No. 16/388,043 dated Nov. 5, 2020.
Notice of Allowance for U.S. Appl. No. 16/452,023 dated Nov. 16, 2020.
Notice of Allowance for U.S. Appl. No. 16/675,290 dated Aug. 10, 2020.
Notice of Allowance for U.S. Appl. No. 16/927,470 dated Oct. 29, 2020.
Supplemental Notice of Allowability for U.S. Appl. No. 16/153,735 dated Jan. 11, 2021.
Corrected Notice of Allowance for U.S. Appl. No. 16/920,191 dated Feb. 15, 2022.
Corrected Notice of Allowance for U.S. Appl. No. 17/091,520 dated Jan. 28, 2022.
Corrected Notice of Allowance for U.S. Appl. No. 17/091,520 dated Mar. 17, 2022.
Final Office Action for U.S. Appl. No. 17/011,042 dated Mar. 14, 2022.
Non-Final Office Action for U.S. Appl. No. 16/935,422 dated Jan. 21, 2022.
Non-Final Office Action for U.S. Appl. No. 16/935,515 dated Jan. 21, 2022.
Non-Final Office Action for U.S. Appl. No. 17/004,373 dated Feb. 15, 2022.
Non-Final Office Action for U.S. Appl. No. 17/060,182 dated Feb. 25, 2022.
Non-Final Office Action for U.S. Appl. No. 17/208,984 dated Apr. 12, 2022.
Non-Final Office Action for U.S. Appl. No. 17/230,566 dated Apr. 12, 2022.
Non-Final Office Action for U.S. Appl. No. 17/337,529 dated Jan. 26, 2022.
Notice of Allowance for U.S. Appl. No. 16/920,191 dated Feb. 2, 2022.
Notice of Allowance for U.S. Appl. No. 17/171,521 dated Apr. 6, 2022.
Notice of Allowance for U.S. Appl. No. 17/091,520 dated Oct. 27, 2021.
Non-Final Office Action for U.S. Appl. No. 17/011,042 dated Oct. 29, 2021.
Non-Final Office Action for U.S. Appl. No. 16/920,191 dated Oct. 15, 2021.
Corrected Notice of Allowance for U.S. Appl. No. 17/091,520 dated Dec. 14, 2021.
Corrected Notice of Allowance for U.S. Appl. No. 16/398,156 dated Nov. 17, 2021.
Corrected Notice of Allowance for U.S. Appl. No. 16/920,191 dated Jun. 22, 2022.
Corrected Notice of Allowance for U.S. Appl. No. 16/920,191 dated May 10, 2022.
Corrected Notice of Allowance for U.S. Appl. No. 16/920,191 dated May 18, 2022.
Corrected Notice of Allowance for U.S. Appl. No. 16/935,422 dated Jun. 8, 2022.
Corrected Notice of Allowance for U.S. Appl. No. 16/935,515 dated Jun. 8, 2022.
Corrected Notice of Allowance for U.S. Appl. No. 17/091,520 dated Apr. 26, 2022.
Corrected Notice of Allowance for U.S. Appl. No. 17/171,521 dated Jul. 7, 2022.
Corrected Notice of Allowance for U.S. Appl. No. 17/171,521 dated Jul. 13, 2022.
Non-Final Office Action for U.S. Appl. No. 17/011,042 dated Jul. 1, 2022.
Non-Final Office Action for U.S. Appl. No. 17/243,747 dated Jun. 6, 2022.
Notice of Allowance for U.S. Appl. No. 16/935,515 dated Jun. 1, 2022.
Notice of Allowance for U.S. Appl. No. 17/004,373 dated May 23, 2022.
Notice of Allowance for U.S. Appl. No. 17/329,276 dated Jun. 28, 2022.
Notice of Allowance for U.S. Appl. No. 16/935,422 dated May 31, 2022.
Notice of Allowance for U.S. Appl. No. 17/060,182 dated Jun. 8, 2022.
Notice of Allowance for U.S. Appl. No. 17/337,529 dated May 4, 2022.
Corrected Notice of Allowance for U.S. Appl. No. 16/935,422 dated Oct. 17, 2022.
Corrected Notice of Allowance for U.S. Appl. No. 16/935,422 dated Sep. 14, 2022.
Corrected Notice of Allowance for U.S. Appl. No. 16/935,515 dated Oct. 17, 2022.
Corrected Notice of Allowance for U.S. Appl. No. 16/935,515 dated Sep. 14, 2022.
Corrected Notice of Allowance for U.S. Appl. No. 17/171,521 dated Aug. 29, 2022.
Corrected Notice of Allowance for U.S. Appl. No. 17/329,276 dated Oct. 11, 2022.
Corrected Notice of Allowance for U.S. Appl. No. 17/337,529 dated Aug. 3, 2022.
Corrected Notice of Allowance for U.S. Appl. No. 17/337,529 dated Oct. 5, 2022.
Final Office Action for U.S. Appl. No. 17/011,042 dated Oct. 7, 2022.
Non-Final Office Action for U.S. Appl. No. 17/209,030 dated Oct. 14, 2022.
Non-Final Office Action for U.S. Appl. No. 17/230,696 dated Oct. 6, 2022.

(56) References Cited

OTHER PUBLICATIONS

Non-Final Office Action for U.S. Appl. No. 17/377,983 dated Oct. 26, 2022.
Non-Final Office Action for U.S. Appl. No. 17/382,398 dated Oct. 19, 2022.
Non-Final Office Action for U.S. Appl. No. 17/408,606 dated Aug. 16, 2022.
Non-Final Office Action for U.S. Appl. No. 17/536,235 dated Oct. 11, 2022.
Non-Final Office Action for U.S. Appl. No. 17/742,648 dated Oct. 5, 2022.
Notice of Allowability for U.S. Appl. No. 17/337,529 dated Aug. 10, 2022.
Notice of Allowability for U.S. Appl. No. 17/004,373 dated Aug. 17, 2022.
Notice of Allowability for U.S. Appl. No. 17/004,373 dated Aug. 31, 2022.
Notice of Allowability for U.S. Appl. No. 17/004,373 dated Oct. 24, 2022.
Notice of Allowability for U.S. Appl. No. 17/060,182 dated Aug. 19, 2022.
Notice of Allowability for U.S. Appl. No. 17/060,182 dated Oct. 20, 2022.
Notice of Allowability for U.S. Appl. No. 17/060,182 dated Sep. 20, 2022.
Notice of Allowance for U.S. Appl. No. 17/208,984 dated Aug. 16, 2022.
Notice of Allowance for U.S. Appl. No. 17/230,566 dated Aug. 25, 2022.
Notice of Allowance for U.S. Appl. No. 17/243,747 dated Sep. 27, 2022.
Notice of Allowance for U.S. Appl. No. 17/365,037 dated Aug. 10, 2022.
Corrected Notice of Allowance for U.S. Appl. No. 17/329,276 dated Nov. 23, 2022.
Corrected Notice of Allowance for U.S. Appl. No. 17/337,529 dated Nov. 10, 2022.
Corrected Notice of Allowance for U.S. Appl. No. 17/365,037 dated Nov. 15, 2022.
Corrected Notice of Allowance for U.S. Appl. No. 17/365,037 dated Nov. 25, 2022.
Corrected Notice of Allowance for U.S. Appl. No. 17/208,984 dated Nov. 23, 2022.
Non-Final Office Action for U.S. Appl. No. 17/887,672 dated Dec. 6, 2022.
Non-Final Office Action for U.S. Appl. No. 17/408,583 dated Nov. 4, 2022.
Notice of Allowability for U.S. Appl. No. 17/243,747 dated Dec. 2, 2022.
Notice of Allowance for U.S. Appl. No. 17/863,874 dated Nov. 18, 2022.
Supplemental Notice of Allowability for U.S. Appl. No. 17/208,984 dated Nov. 10, 2022.

* cited by examiner

SIGNAL CANCELLATION IN RADIO FREQUENCY (RF) DEVICE NETWORK

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 15/836,198, filed Dec. 8, 2017

This Application makes reference to:
U.S. Pat. No. 10,321,332, filed on May 30, 2017, entitled "Non-Line-Of-Sight (NLOS) Coverage for Millimeter Wave Communication";
U.S. Pat. No. 10,348,371, filed on Dec. 7, 2017, entitled "Optimized Multi-Beam Antenna Array Network with an Extended Radio Frequency Range";
U.S. Pat. No. 10,014,887, filed on Feb. 14, 2017, entitled "Outphasing Transmitters with Improved Wireless Transmission Performance and Manufacturability"; and
U.S. Pat. No. 7,848,386, filed on Sep. 22, 2006, entitled "Frequency hopping RF transceiver with programmable antenna and methods for use therewith."

Each of the above referenced Application is hereby incorporated herein by reference in its entirety.

FIELD OF TECHNOLOGY

Certain embodiments of the disclosure relate to reflector devices in a radio frequency (RF) communication system. More specifically, certain embodiments of the disclosure relate to a method and system for signal cancellation in RF device network.

BACKGROUND

Typically, in an RF device network, radio transmitter devices (for example, mobile base stations and television/radio broadcast stations) broadcast RF energy in form of beams of RF signals to a variety of RF receiver devices. Such beams of RF signals may reach the receiving antenna via multiple paths. As a result, such beams of RF signals may constructively or destructively interfere with each other at the receiving antenna. Constructive interference occurs when the beams of RF signals are in phase, and destructive interference occurs when the beams of RF signals are half a cycle out of phase. For the latter case, there is required a robust and advanced system in an RF device network by which the beams of RF signals are intelligently controlled for signal cancellation in such RF device network.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for signal cancellation in RF device network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for signal cancellation in RF device network. In the following description, reference is made to the accompanying drawings, which form a part hereof, and in which is shown, by way of illustration, various embodiments of the present disclosure.

Figure 1:
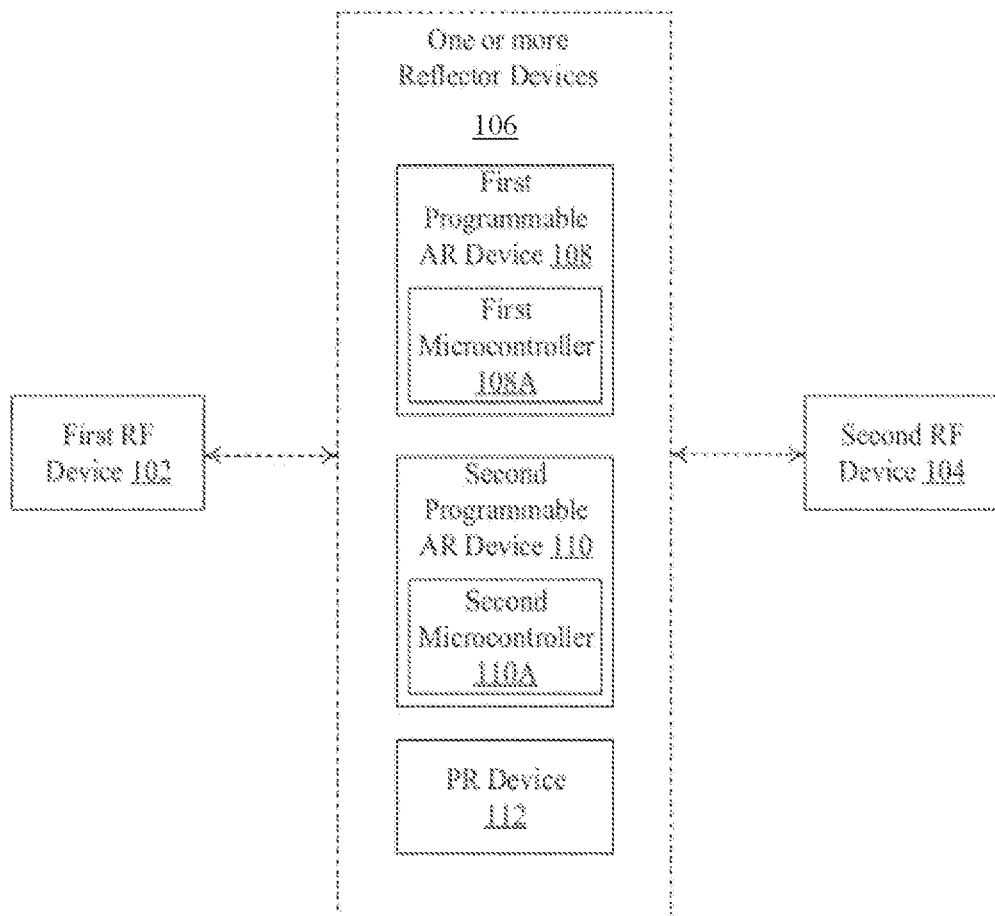
FIG. 1 is an exemplary network environment diagram, in accordance with an exemplary embodiment of the disclosure.

FIG. 1 is an exemplary network environment diagram, in accordance with an exemplary embodiment of the disclosure. With reference to FIG. 1, there is shown a network environment diagram 100 that may correspond to an RF device network. The RF device network may include various RF devices, such as a first RF device 102, a second RF device 104, and one or more reflector devices 106. In accordance with an embodiment, the one or more reflector devices 106 may include a first programmable active reflector (AR) device 108. In accordance with other embodiments, the one or more reflector devices 106 may further include a second programmable AR device 110 and a passive reflector (PR) device 112. There is further shown a first AR microcontroller 108A in the first programmable AR device first programmable AR device 108 and a second AR microcontroller 110A in the second programmable AR device 110.

Although there are shown only two programmable AR devices and one PR device, the disclosure is not so limited. As a matter of fact, the count of the programmable AR devices and the PR devices may vary based on various factors, such as the location of the first RF device 102, relative distance of the first RF device 102 from the second RF device 104, and count and type of physical obstructing devices, without deviation from the scope of the disclosure.

In accordance with an embodiment, one or more circuits of each of the one or more reflector devices 106 may be integrated in a package of the plurality of antenna modules of the corresponding reflector device. In accordance with an embodiment, the one or more circuits of each of the one or more reflector devices 106 may be on a printed circuit board on which the plurality of antenna modules of the corresponding reflector device is mounted.

The first RF device 102 is a fixed point of communication that may communicate information, in the form of a plurality of beams of RF signals, to and from a transmitting/receiving device, such as the second RF device 104, via one or more reflector devices 106. Multiple base stations, corresponding to one or more service providers, may be geographically positioned to cover specific geographical areas. Typically, bandwidth requirements serve as a guideline for a location of the first RF device 102 based on relative distance between the first RF device 102 and the second RF device 104. The count of instances of the first RF device 102 in the RF device network may depend on, for example, expected usage, which may be a function of population density, and geographic irregularities, such as buildings and mountain ranges, which may interfere with the plurality of beams of RF signals. Various examples of the first RF device 102 may include a base station, an access point, and other such source of RF transmission.

In accordance with an embodiment, the first RF device 102, in conjunction with a global positioning system (GPS), may be configured to determine locations of the one or more reflector devices 106. Apart from the GPS, various other techniques, for example, radio frequency identification (RFID) system, global navigation satellite system (GNSS), site map, signal delay, database information, and the like may also be deployed to determine the location of the one or more reflector devices 106.

The first RF device 102 may comprise one or more circuits that may be configured to dynamically select the one or more reflector devices 106, such as the first programmable AR device 108, the second programmable AR device 110, and the PR device 112, along a non-line-of-sight (NLOS) radio signal path. Such a combination of the various dynamically selected one or more reflector devices 106 along the NLOS radio signal path may form a multi-beam antenna array network.

In accordance with an embodiment, the first RF device 102 may be configured to determine an optimized NLOS radio signal path out of multiple available NLOS radio signal paths for the transmission of the plurality of beams of RF signals to various RF devices in the RF device network. Accordingly, the first RF device 102 may be configured to control the dynamically selected one or more reflector devices 106 based on a set of criteria, described below.

The second RF device 104 may correspond to a telecommunication hardware operable to receive the plurality of RF signals from the first RF device 102 and/or the one or more reflector devices 106. Examples of the second RF device 104 may include, but are not limited to, laptop host computers, personal digital assistant hosts, personal computer hosts, and/or cellular device hosts that include a wireless RF transceiver. The second RF device 104 may be configured to receive the plurality of RF signals from the first RF device 102, via an optimized NLOS radio signal path. The optimized NLOS radio signal path may correspond to an optimal radio signal path for propagation of a beam of RF signals, for which the line-of-sight (LOS) is otherwise obscured (partially or completely) by physical objects. Such obstructing physical objects make it difficult for the RF signal to pass through in a wireless communication network in the LOS, thus is the reason for selection of the optimized NLOS radio signal path. Common physical objects that may partially or completely obstruct the LOS between an RF transmitter device and an RF receiver device, may include, for example, tall buildings, tinted glass, doors, walls, trees, physical landscape, and high-voltage power conductors. The plurality of radio signal paths may be facilitated by various wireless communication standards, such as, but not limited to, IEEE 802.11n (Wi-Fi), IEEE 802.11ac (Wi-Fi), HSPA+(3G), WiMAX (4G), and Long Term Evolution (4G), 5G, power-line communication for 3-wire installations as part of ITU G.hn standard, and HomePlug AV2 specification. In accordance with an embodiment, the wireless communication network may facilitate extremely high frequency (EHF), which is the band of radio frequencies in the electromagnetic spectrum from 30 to 300 gigahertz. Such radio frequencies have wavelengths from ten to one millimeter, referred to as millimeter wave (mmWave).

The one or more reflector devices 106 may correspond to RF devices that may have multiple antenna elements, which may be fed in phase for generating single or multiple beams of RF signals, and perform a plurality of operations, for example, increasing antenna gain and reducing radiation in unwanted directions and unwanted locations, on the single or multiple beams of RF signals.

Each of the first programmable AR device 108 and the second programmable AR device 110 in the one or more reflector devices 106 may be a single-beam or a multi-beam AR device configured to perform a plurality of operations on a plurality of beams of RF signals received from an RF device, such as the first RF device 102, an access point (not shown), or a reflector device, for example, the PR device 112 or other AR devices. Examples of such plurality of operations may include, but are not limited to, adjusting an amplitude gain, adjusting phase shift, performing beam forming to generate a plurality of beams of RF signals, and performing beam steering based on the phase shifting of the plurality of beams of RF signals to deflect the plurality of beams at a desired angle. It may be noted that the first programmable AR device 108 and the second programmable AR device 110 may require a substantial DC power for performing the above-mentioned operations.

The first programmable AR device 108 and the second programmable AR device 110 may be positioned in vicinity of physical obstructing objects, such as a tree or a tinted glass window, which may partially block or impair the path of the plurality of beams of RF signals. Each of the first programmable AR device 108 and the second programmable AR device 110 may be realized based on other components, such as a plurality of low-noise amplifiers, a plurality of phase shifters, a combiner, a splitter, a plurality of power amplifiers, and mixers.

The PR device 112 may be configured to provide only a deflection to the plurality of beams of RF signals without adjusting the amplitude gain and the phase shift of the plurality of beams of RF signals. The PR device 112 may provide the deflection based on various parameters, such as an incident angle, scan angle, and sizes of the PR device 112. The PR device 112 may be positioned in a vicinity of a physical obstructing object, such as a building, that may completely block the path of the plurality of beams of RF signals. The PR device 112 may be realized by a simple metal plane with a flat or a curved surface. The PR device 112 may be arranged at an incident angle, so that the angle of incoming plurality of beams of RF signals corresponds to the angle of the outgoing plurality of beams of RF signals.

Each of the first programmable AR device 108 and the second programmable AR device 110 may comprise a first antenna array, i.e. a transmitter array, and a second antenna array, i.e. a receiver array. In accordance with an embodiment, the first antenna array may be configured to transmit a set of beams of RF signals to one or more RF devices, for example, the first RF device 102, the second RF device 104, and other AR or PR devices in the RF device network. Likewise, in accordance with another embodiment, the second antenna array may be configured to receive another set of beams of RF signals from the one or more RF devices.

In operation, one or more circuits in the second RF device 104, for example, a radio device, may be configured to generate a request based on an input from a noise detection unit. The noise detection unit may be configured to detect a presence of noise that exceeds a threshold level. The noise may be generated by the second RF device 104 that may interfere with the reception of the plurality of RF signals by devices such as Wireless Wide Area Network Adapters. This may reduce the sensitivity of the adapter and thus, the range till the first RF device 102, for example, a base station. The noise may be further generated by in-band noise sources that may create co-channel interference with the plurality of RF signals that may degrade the desired received RF signal.

Based on various methods, systems, or techniques, known in the art, the second RF device 104 may be configured to locate the one or more reflector devices 106 to transmit the generated request. According to one of such systems, for example, a radio frequency identification (RFID) system, each RFID tag may be associated with each RF device in the RF device network for various operations, for example, tracking inventory, tracking status, location determination, assembly progress, and the like. The RF device network may include one or more RFID readers. Each RFID reader may wirelessly communicate with one or more RFID tags within corresponding coverage area. The RFID readers may collect data, for example location data, from each of the RFID tags within corresponding coverage area. The collected data may be communicated to the first RF device 102 via wired or wireless connection and/or via peer-to-peer communication. Other techniques may include global GPS, GNSS, site map, signal delay, database information, and the like may also be deployed to determine the location of the one or more reflector devices 106.

Once located, the second RF device 104 may be configured to transmit the generated request to the one or more reflector devices 106. The second RF device 104 may further transmit the associated metadata along with the request. The associated metadata may include at least a specified direction and a specified location of the second RF device 104. In accordance with an embodiment, the second RF device 104 may transmit/receive the plurality of beams of RF signals to/from only one of the one or more reflector devices 106, such as the first programmable AR device 108. In such a case, only the first programmable AR device 108 receives the request and associated metadata from the second RF device 104 and processes the received request based on the associated metadata. In accordance with another embodiment, the second RF device 104 may transmit/receive the plurality of beams of RF signals to/from multiple reflector devices from one or more reflector devices 106. In such a case, the plurality of reflector devices receives the request from the second RF device 104 and further transmits to a central server/computer, such as the first RF device 102, for further processing. Accordingly, the first RF device 102 may be configured to process the request based on the associated metadata.

In accordance with an embodiment, the first RF device 102 may be configured to dynamically select reflector devices, such as the first programmable AR device 108, the second programmable AR device 110, and the PR device 112, from the one or more reflector devices 106 along the optimized NLOS radio signal path based on a set of criteria. The PR device 112 may also be selected in addition to the first programmable AR device 108 and second programmable AR device 110 to further facilitate the redirection of the transmission of one or more beams of RF signals in case one of the first programmable AR device 108 or second programmable AR device 110 is completely blocked or mitigated by a physical obstructing object, such as high-voltage conducting device.

Such a combination of the various dynamically selected one or more reflector devices 106, may form a multi-beam antenna array network. The set of criteria for the dynamic selection of the one or more reflector devices 106 may correspond to a location of the one or more reflector devices 106, a relative distance of the one or more reflector devices 106 with respect to the RF transmitter device, a type of one or more physical obstructing objects, and one or more parameters measured at the one or more reflector devices 106. The one or more parameters may correspond to at least an antenna gain, a signal-to-noise ratio (SNR), a signal-to-interference-plus-noise ratio (SINR), a carrier-to-noise (CNR), and a carrier-to-interference-and-noise ratio (CINR) of the one or more reflector devices 106.

The first RF device 102 may be further configured to determine that the NLOS radio signal path is an optimized radio signal path for such RF transmission. The optimized NLOS radio signal path may correspond to optimized characteristics, for example, shortest radio path, optimum signals level, maximum bitrate, increased access speed, highest throughput, and the like, between, for example, the first RF device 102 and the second RF device 104. The optimized NLOS radio signal path may further correspond to a guaranteed transmission of the plurality of beams of RF signals to the second RF device 104.

Accordingly, the first RF device 102 may be configured to dynamically control the programmable reflector devices, such as the first programmable AR device 108 and the second programmable AR device 110, selected from the one or more reflector devices 106 along the optimized NLOS radio signal path.

Each of the first programmable AR device 108 and second programmable AR device 110 may comprise a first antenna array and a second antenna array that may be dual-polarized. In accordance with an embodiment, signal strength of a beam of RF signal received by the second antenna array 202B at the first programmable AR device 108 is typically lesser than signal strength of a beam of RF signals transmitted by the first antenna array 202A. As such, the received beam of RF signals at the second antenna array 202B may be susceptible to interference from the transmitted beam of RF signals by the first antenna array 202A. Therefore, to mitigate or limit the interference, isolation is provided between the transmitter and the receiver chip in the first programmable AR device 108. In accordance with an exemplary implementation for such isolation, the first antenna array 202A and the second antenna array 202B may include antenna elements that may be dual-polarized, such as vertically polarized and horizontally polarized. The dual-polarized antenna elements may be, for example, a patch antenna, a dipole antenna, or a slot antenna. It may be noted that the dual polarization of antenna elements is not just limited to precisely and mathematically vertical or horizontal. Notwithstanding, without deviation from the scope of the disclosure, dual polarization may refer to any two polarizations of an antenna, for example, substantially or approximately ±45 degrees. In other implementations, the antenna polarizations may be non-orthogonal. Accordingly, the first antenna array 202A and the second antenna array 202B may be implemented sufficiently apart from each other and provided respective RF shields to minimize inter-modulation or mutual interferences.

The first antenna array and the second antenna array in each of the first programmable AR device 108 and the second programmable AR device 110 may constitute the multi-beam antenna array system. Each of the first antenna array and the second antenna array may include at least a plurality of programmable antenna elements and a signal parameter control unit. Each of the plurality of programmable antenna elements, in conjunction with respective microcontrollers, such as the first AR microcontroller 108A and the second AR microcontroller 110A, may tune the first antenna array to perform beam forming and beam steering based on adjustment of one or more signal parameters, i.e. the gain, phase, frequency, and the like, on an incoming plurality of RF signals.

Thus, such plurality of programmable antenna elements may combine to generate a controlled beam of the plurality of RF signals that may cause destructive interference in a specified direction and specified location of second RF device 104 within the transmission range of the controlled one or more reflector devices 106. Accordingly, the radiation from the programmable antenna element in the specified direction and the specified location of the second RF device 104 may be attenuated significantly, by at least an order or magnitude, in order to attenuate interference with another AR device. As the main lobe is steered towards the first RF device 102 to improve signal strength, beam patterns null spaces may be steered towards the source of interference, i.e. the second RF device 104. Thus, null spaces may be formed based on a destructive interference of the converged plurality of beams of RF signals, received from the first programmable AR device 108 and the second programmable AR device 110, in the specified direction and the specified location of the second RF device 104. Resultantly, phase cancellation may be performed between the plurality of beams of RF signals to generate the null space in the specified direction and specified location of the second RF device 104.

In accordance with an embodiment, the transmission of the plurality of RF signals by the one or more reflector devices 106 may be performed to generate destructive interference in the air in the specified direction and the specified location of the second RF device 104. In accordance with another embodiment, the transmission of the plurality of RF signals by the one or more reflector devices 106 may be received at antenna arrays of RF receiver devices, such as the second RF device 104, which generate the destructive superposition of the RF signals using RF circuits and transmission lines.

It may be noted that the selection of the one or more reflector devices 106 and the determination of the NLOS radio signal path, in the above exemplary scenario, may be based on the shortest distance, presence of interference sources, and type of obstructing physical object. However, it should not the construed to be limiting the scope of the disclosure. Notwithstanding, the selection of the one or more reflector devices 106, and the determination of the NLOS radio signal path may be further based on other parameters, without deviation from the scope of the disclosure.

Figure 2:
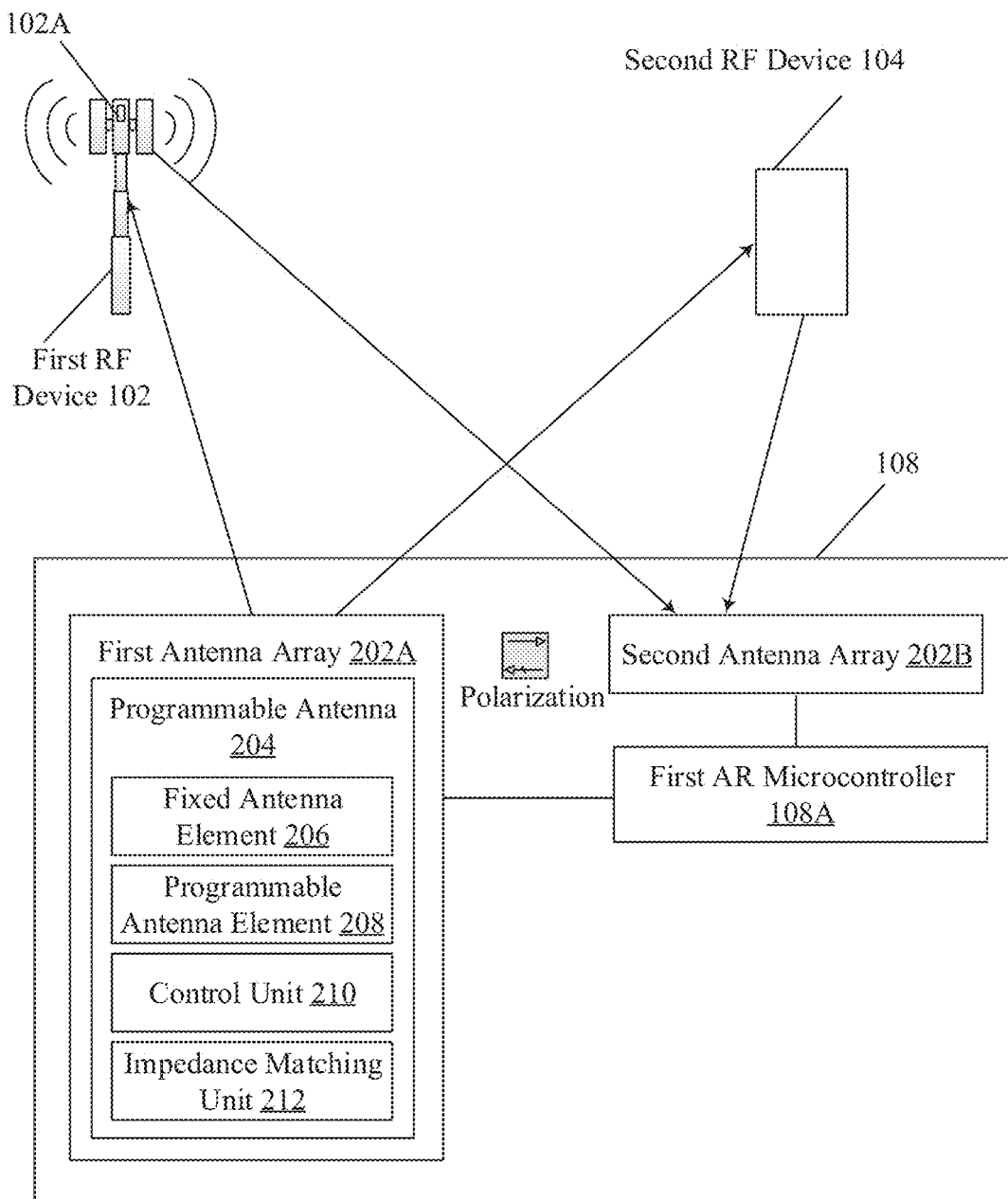
FIG. 2 illustrates a block diagram of an exemplary programmable AR device, in accordance with an exemplary embodiment of the disclosure.

FIG. 2 illustrates a block diagram of an exemplary programmable AR device, in accordance with an exemplary embodiment of the disclosure. With reference to FIG. 2, there is shown the first programmable AR device 108 that transmits the plurality of beams of RF signals, in accordance with an exemplary embodiment of the disclosure. With reference to FIG. 2, the first programmable AR device 108 may correspond to a single-beam or a multi-beam AR device and may include a first antenna array 202A and a second antenna array 202B.

The first antenna array 202A may include a first AR microcontroller 108A and a programmable antenna 204 for transmission of a plurality of beams of RF signals. The programmable antenna 204 may include a fixed antenna element 206, a programmable antenna element 208, a control unit 210, and an impedance matching unit 212.

In operation, the second antenna array 202B may be configured to receive a request and associated metadata from the second RF device 104 for signal cancellation. In accordance with an embodiment, only the first programmable AR device 108 may receive the request and associated metadata from the second RF device 104. In such a case, only the first programmable AR device 108 processes the received request based on the associated metadata. In accordance with another embodiment, the plurality of reflector devices may receive the request and associated metadata from the second RF device 104. In such a case, the request may be further transmitted to a central server/computer, such as the first RF device 102 for further processing. Accordingly, the first RF device 102 may be configured to process the request (based on the associated metadata) by locating the plurality of reflector devices, and thereafter, dynamically selecting and controlling the one or more reflector devices 106.

It may be noted that the following description is with respect to an embodiment, in which only the first programmable AR device 108 receives the request and associated metadata from the second RF device 104 for signal cancellation. In accordance with other embodiments, similar exemplary operations, as explained with respect to the first programmable AR device 108, may be performed in conjunction (or parallel) with other programmable AR devices, based on one or more antenna control signals provided by first RF device 102, without deviation from the scope of the disclosure.

In accordance with an embodiment, the programmable antenna 204 may be configured to be tuned to one of a plurality of signal parameters, such as resonant frequencies, in response to a signal parameter selection signal, such as a frequency selection signal. The programmable antenna 204 may be tuned to a particular resonant signal parameter value in response to one or more antenna control signals generated by the control unit 210. Accordingly, the programmable antenna 204 may be dynamically tuned to a specific carrier signal parameter or sequence of carrier signal parameter values of a transmitted RF signal and/or a received RF signal.

The fixed antenna element 206 may have a resonant signal parameter or center signal parameter of operation that may be dependent upon physical dimensions of the fixed antenna element 206, such as a length of a one-quarter wavelength antenna element or other such dimension. The programmable antenna element 208 may modify the "effective" length or dimension of the control unit 210 by selectively adding or subtracting from the reactance of the programmable antenna element 208 to confirm to changes in the selected signal parameter and the corresponding changes in other signal parameters. The fixed antenna element 206 may include one or more elements, such as a dipole, loop, annular slot or other slot configuration, rectangular aperture, circular aperture, line source, helical element or other element or antenna configuration, or a combination thereof.

The control unit 210 may generate the one or more antenna control signals in response to the signal parameter selection signal. The control unit 210 may generate the one or more antenna control signals to command the programmable antenna element 208 to modify the impedance in accordance with a desired resonant signal parameter or the particular carrier signal parameter that is indicated by the signal parameter selection signal.

In accordance with an exemplary implementation, the set of possible carrier signal parameters may be known in advance and the control unit 210 may be preprogrammed with the specific antenna control signals that correspond to each carrier signal parameter. In accordance with another exemplary implementation, the control unit 210, based on equations derived from impedance network principles, known in the art, may calculate the specific impedance that may generate the antenna control commands to implement the specific impedance.

The programmable antenna 204 may optionally include the impedance matching unit 212 that may include a plurality of adjustable reactive network elements. The adjustable reactive network elements are tunable in response to a corresponding plurality of matching network control signals, to provide a substantially constant load impedance. The plurality of matching network control signals may be generated by the control unit 210 in response to the adjusted one or more signal parameters, such as amplitude and phase, of the antenna current. The impedance matching unit 212 may include a transformer, for example, a balun transformer, an L-section, pi-network, t-network or other impedance network that may perform the function of impedance matching. The method for controlling the plurality of beams of RF signals has been described in detail in FIG. 4.

Figure 3:
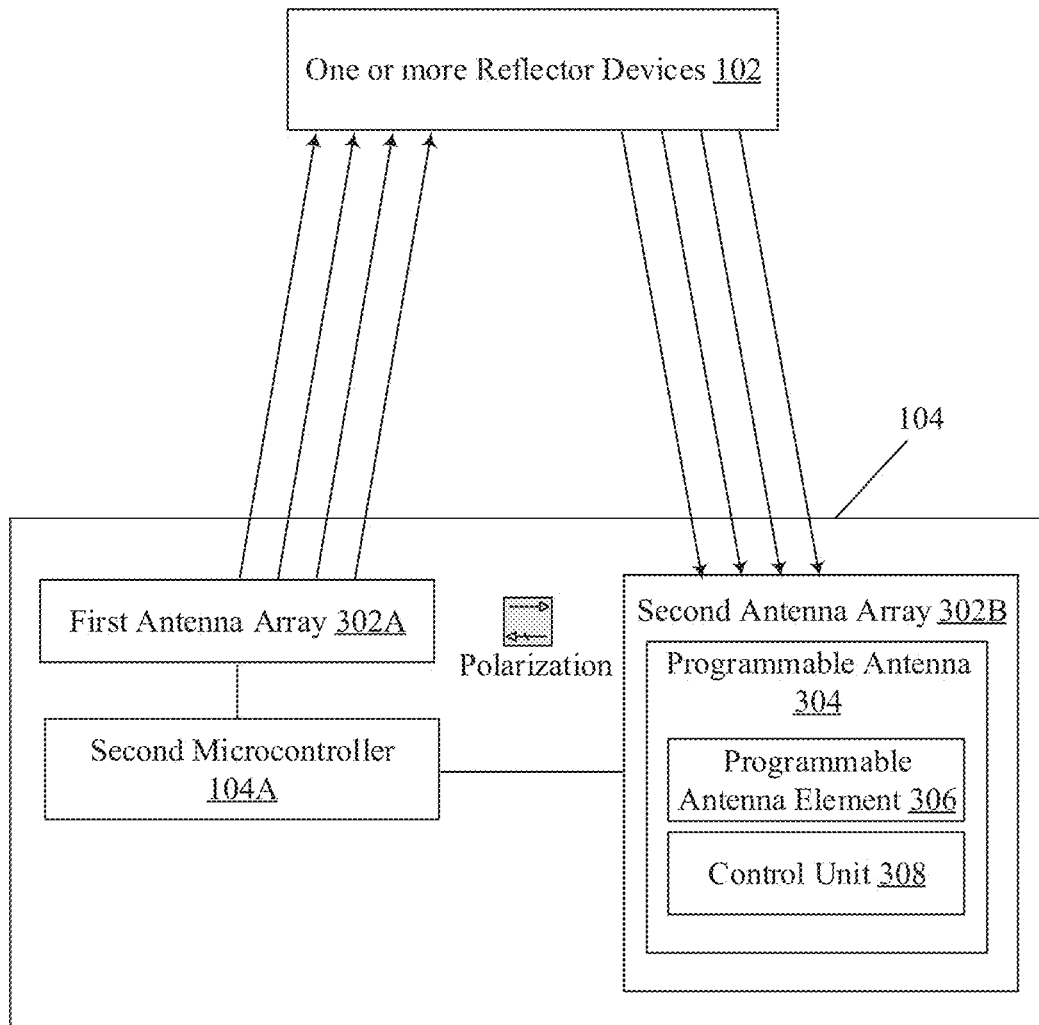
FIG. 3 illustrates a block diagram of an exemplary second RF device, in accordance with an exemplary embodiment of the disclosure.

FIG. 3 illustrates a block diagram of an exemplary second RF device, in accordance with an exemplary embodiment of the disclosure. With reference to FIG. 3, there is shown the second RF device 104, in accordance with an exemplary embodiment of the disclosure. With reference to FIG. 3, the second RF device 104 may include a first antenna array 302A and a second antenna array 302B. The second antenna array 302B may include a second microcontroller 104A and a programmable antenna 304 for reception of plurality of beams of RF signals. The programmable antenna 304 may include a programmable antenna element 306 and a control unit 308. The second RF device 104 may further include various additional components, such as a down conversion unit that further includes a mixing unit, an ADC unit, and may also include a filtering and/or gain unit, not shown in FIG. 3. The second RF device 104 may be further configured to process baseband or low IF signal in accordance with a particular wireless communication standard (such as, IEEE 802.11, Bluetooth, RFID, GSM, CDMA, and the like). The processing may include various exemplary operations, such as, but not limited to, digital intermediate frequency to baseband conversion, demodulation, demapping, depuncturing, decoding, and/or descrambling.

The programmable antenna element 306 may be configured to be tuned to a selected carrier signal parameter in response to a signal parameter selection signal. The control unit 308 may control a signal parameter, such as frequency, of the receiver local oscillation, in accordance with a desired carrier frequency. In accordance with an embodiment, the control unit 308 may select the carrier signal parameter based on channel characteristics, such as a received signal strength indication (RSSI), SNR, SIR, bit error rate, retransmission rate, or other performance indicator.

In operation, one or more circuits in the second RF device 104, for example, a radio device, may be configured to generate a request based on an input from a noise detection unit. The noise detection unit may be configured to detect a presence of noise that exceeds a threshold level. The noise may be generated by the second RF device 104 that may interfere with the reception of the plurality of RF signals by devices such as Wireless Wide Area Network Adapters. This may reduce the sensitivity of the adapter and thus, the range till the first RF device 102, for example, a base station. The noise may be further generated by in-band noise sources that may create co-channel interference with the plurality of RF signals that may degrade the desired received RF signal.

Based on various methods, systems, or techniques, as described in FIG. 1, the second RF device 104 may be configured to locate the one or more reflector devices 106 to transmit the generated request and associated metadata, such as a specified direction and a specified location for generating null spaces. The generated request corresponds to signal cancellation, such as noise cancellation, in the specified direction and the specified location of the second RF device 104.

Once located, the second RF device 104 may be configured to transmit the generated request and associated metadata to the one or more reflector devices 106 via the first antenna array 302A. In accordance with an embodiment, the second RF device 104 may receive the plurality of beams of RF signals from only one of the one or more reflector devices 106, such as the first programmable AR device 108. In accordance with another embodiment, the second RF device 104 may receive the plurality of beams of RF signals from multiple reflector devices from one or more reflector devices 106.

In accordance with an embodiment, the second antenna array 302B may be configured to receive a beam of RF signals from only the first programmable AR device 108. In accordance with another embodiment, the second antenna array 302B may be configured to receive a plurality of beams of RF signals from multiple reflector devices. The programmable antenna 304 in the second antenna array 302B, in conjunction with similar one or more programmable antennas described in FIG. 2, may be configured to combine the received plurality of beams of RF signals to generate a controlled beam, such as with a main lobe in one direction, and a null in another direction. As discussed in conjunction with FIG. 2, the signal parameters adjustments, such as magnitudes and phases adjustments, for each of the antennas may be performed based on various techniques to achieve the desired beam shape.

It may be noted that the first antenna array 302A and the second antenna array 302B in second RF device 104 may be dual-polarized. The dual-polarized first antenna array 302A and the second antenna array 302B may be implemented sufficiently apart from each other in isolation and provided respective RF shields to minimize inter-modulation or mutual interferences.

Figure 4:
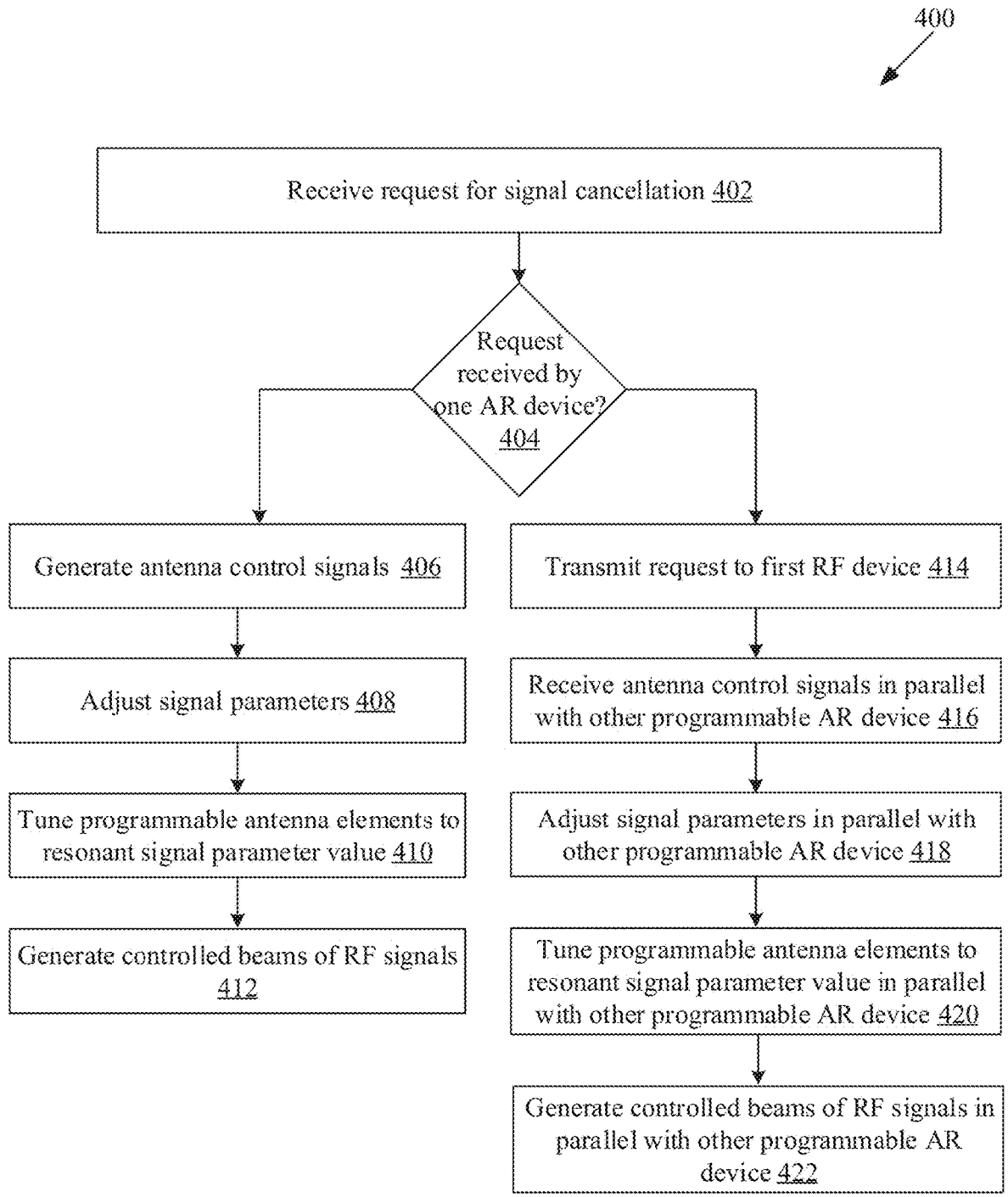
FIG. 4 depicts a flow chart illustrating exemplary operations of an exemplary programmable active reflector (AR) device for signal cancellation in RF device network, in accordance with an exemplary embodiment of the disclosure.

FIG. 4 depicts a flow chart illustrating exemplary operations of an exemplary programmable AR device for signal cancellation in RF device network, in accordance with an exemplary embodiment of the disclosure. The exemplary operations in FIG. 4 are explained in conjunction with FIGS. 1 and 2. Referring to FIG. 4, there is shown a flow chart 400 comprising exemplary operations 402 through 422.

At 402, a request for signal cancellation may be received. In accordance with an embodiment, the first programmable AR device 108 may receive a request from the second RF device 104, via the second antenna array 202B, for signal cancellation.

At 404, it may be determined that whether the request is received only by the first programmable AR device 108 or also by one or more other AR devices, such as second programmable AR device 110. The determination may be based on metadata associated with the received request. In accordance with an embodiment, only the first programmable AR device 108 receives the request. In such a case, control passes to 406. In accordance with another embodiment, one or more other AR devices, such as second programmable AR device 110, in addition to the first programmable AR device 108 may receive the request. In such a case, control passes to 414.

At 406, when only the first programmable AR device 108 receives the request, one or more antenna control signals may be generated. In accordance with an embodiment, the one or more antenna control signals may be generated by the control unit 210 of the first programmable AR device 108. The control unit 210 may generate the one or more antenna control signals in response to a signal parameter selection signal. The control unit 210 may generate the one or more antenna control signals to command the programmable antenna element 208 to modify the impedance in accordance with a desired resonant signal parameter or the particular carrier signal parameter that is indicated by the signal parameter selection signal.

In accordance with an exemplary implementation, a set of carrier signal parameter values may be known in advance and the control unit 210 may be preprogrammed with the specific one or more antenna control signals that correspond to each carrier signal parameter. In accordance with another exemplary implementation, the control unit 210, based on equations derived from impedance network principles, known in the art, may calculate the specific impedance that may generate the antenna control commands to implement the specific impedance.

At 408, one or more of a plurality of signal parameters may be adjusted in response to one or more antenna control signals. In accordance with an embodiment, the first AR microcontroller 108A may be configured to adjust one or more of a plurality of signal parameters in response to one or more antenna control signals generated by the control unit 210.

At 410, one or more programmable antenna elements may be tuned to a particular resonant signal parameter value in response to one or more antenna control signals. In accordance with an embodiment, the programmable antenna element 208 may be tuned to a particular resonant signal parameter value in response to one or more antenna control signals generated by the control unit 210. The programmable antenna element 208 may be configured to be tuned to one or more of a plurality of signal parameters, such as resonant frequencies, in response to the signal parameter selection signal, such as a frequency selection signal. The programmable antenna 204 may optionally include the impedance matching unit 212 that may include a plurality of adjustable reactive network elements. The adjustable reactive network elements are tunable in response to a corresponding plurality of matching network control signals, to provide a substantially constant load impedance. The plurality of matching network control signals may be generated by the control unit 210 in response to the adjusted one or more signal parameters, such as amplitude and phase, of the antenna current. The impedance matching unit 212 may include a transformer, for example, a balun transformer, an L-section, pi-network, t-network or other impedance network that may perform the function of impedance matching.

Each of the plurality of programmable antenna elements, in conjunction with respective microcontrollers, such as the first AR microcontroller 108A, may tune the first antenna array 202A to perform beam forming and beam steering based on adjustment of one or more signal parameters, i.e. the gain, phase, frequency, and the like, on an incoming plurality of RF signals.

At 412, the plurality of programmable antenna elements may generate one or more controlled beams of RF signals. In accordance with an embodiment, the programmable antenna 204 in combination with the one or more other similar programmable antenna elements may generate one or more controlled beams of RF signals based on the associated metadata. The one or more controlled beams of RF signals cause destructively interference in the specified direction and the specified location of second RF device 104 within the transmission range of the first programmable AR device 108. Accordingly, the radiation from the programmable antenna element in the specified direction and the specified location of the second RF device 104 may be attenuated significantly, by at least an order or magnitude, in order to attenuate interference with another AR device. As the main lobe is steered towards the first RF device 102 to improve signal strength, beam patterns null spaces may be steered towards the source of interference, i.e. the second RF device 104. Thus, null spaces may be formed based on a destructive interference of the converged plurality of beams of RF signals, received from the first programmable AR device 108 and the second programmable AR device 110, in the specified direction and the specified location of the second RF device 104. Resultantly, phase cancellation may be performed between the plurality of beams of RF signals to generate the null space in the specified direction and the specified location of the second RF device 104.

At 414, when one or more other AR devices, such as second programmable AR device 110, in addition to the first programmable AR device 108, the request may be transmitted to the first RF device 102.

At 416, a first set of antenna control signals may be received. In accordance with an embodiment, the first antenna array 202A may be configured to receive the first set of one or more antenna control signals from the first RF device 102. In such an embodiment, the first antenna arrays of one or more other AR devices, such as the second programmable AR device 110, may also be configured to receive a second set of the one or more antenna control signals from the first RF device 102.

At 418, one or more of a plurality of signal parameters may be adjusted in response to the first and the second set of antenna control signals. In accordance with an embodiment, the first AR microcontroller 108A may be configured to adjust one or more of a plurality of signal parameters in response to the first set of antenna control signals generated by the control unit 210. Further, the second AR microcontroller 110A may be configured to adjust one or more of a plurality of signal parameters in response to the second set of antenna control signals generated by corresponding control unit.

At 420, one or more programmable antenna elements may be tuned to a particular resonant signal parameter value in response to the first and the second set of antenna control signals. In accordance with an embodiment, the programmable antenna elements of the first programmable AR device 108 and also the second programmable AR device 110 may be tuned to a particular resonant signal parameter value in response to one or more antenna control signals generated by respective control units. The programmable antennas of the first programmable AR device 108 and second programmable AR device 110 may be configured to be tuned to one or more of a plurality of signal parameters, such as resonant frequencies, in response to two signal parameter selection signals, such as frequency selection signals. The programmable antennas of the first programmable AR device 108 and second programmable AR device 110 may optionally include a plurality of adjustable reactive network elements. The adjustable reactive network elements are tunable in response to a corresponding plurality of matching network control signals, to provide a substantially constant load impedance. The plurality of matching network control signals may be generated by the control unit 210 in response to the adjusted one or more signal parameters, such as amplitude and phase, of the antenna current.

Each of the plurality of programmable antenna elements, in conjunction with respective microcontrollers, such as the first AR microcontroller 108A and the second AR microcontroller 110A, may tune the first antenna arrays of respective programmable AR devices to perform beam forming and beam steering based on adjustment of one or more signal parameters, i.e. the gain, phase, frequency, and the like, on plurality of RF signals.

At 422, the plurality of programmable antenna elements may generate a plurality of controlled beams of RF signals. In accordance with an embodiment, the programmable antenna elements of the first programmable AR device 108 and second programmable AR device 110 may generate a plurality of controlled beams of RF signals. The plurality of controlled beams of RF signals cause destructive interference in the specified direction and the specified location of second RF device 104 within the transmission range of the first programmable AR device 108 and the second programmable AR device 110. Accordingly, the radiation from the programmable antenna elements of the two programmable AR devices in the direction and at the location of the second RF device 104 may be attenuated significantly, by at least an order or magnitude, in order to attenuate interference. As the main lobe is steered towards the first RF device 102 to improve signal strength, beam patterns nulls may be steered towards the source of interference, i.e. the second RF device 104, for suppression. Resultantly, phase cancellation may be performed between the plurality of beams of RF signals to generate the null space in the specified direction and the specified location of the second RF device 104.

Figure 5:
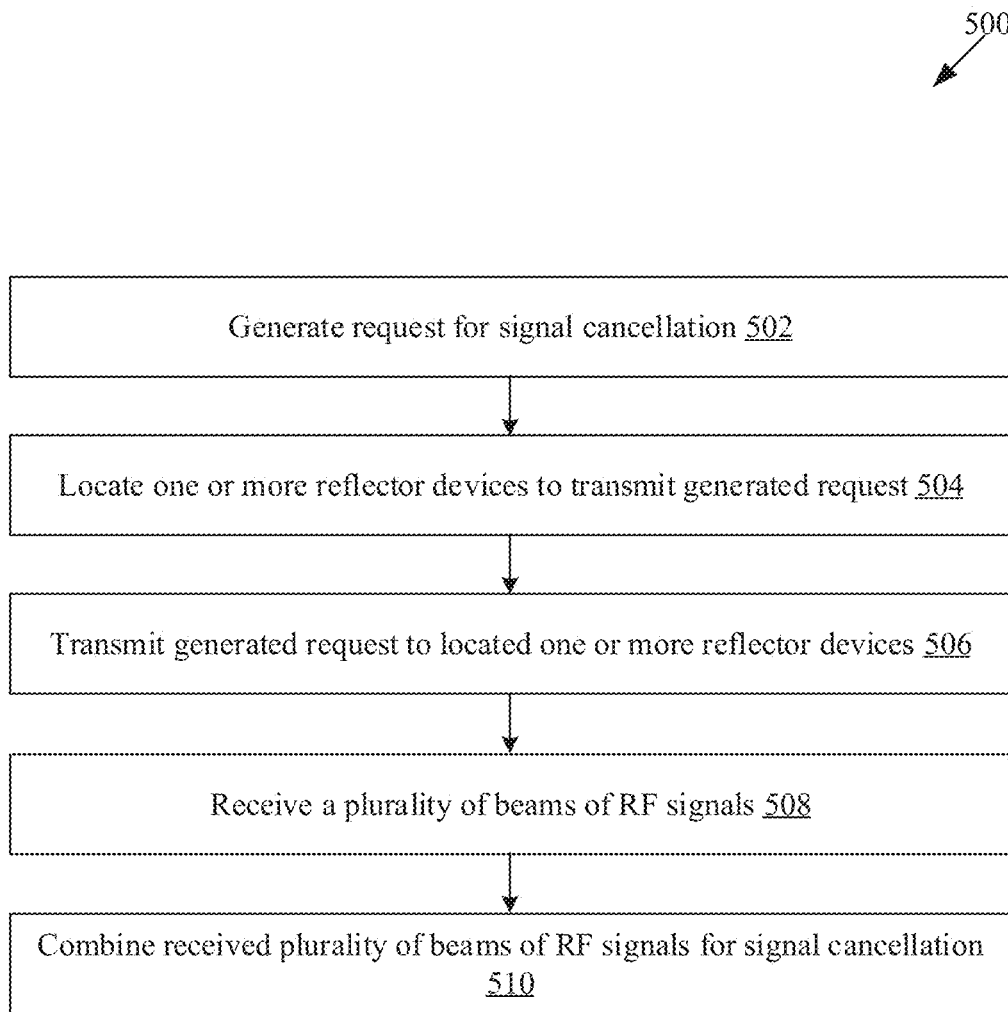
FIG. 5 depicts a flow chart illustrating exemplary operations of an exemplary second RF device for signal cancellation in RF device network, in accordance with an exemplary embodiment of the disclosure.

FIG. 5 depicts a flow chart illustrating exemplary operations of an exemplary second RF device for signal cancellation in RF device network, in accordance with an exemplary embodiment of the disclosure. The exemplary operations in FIG. 5 are explained in conjunction with FIGS. 1 and 3. Referring to FIG. 5, there is shown a flow chart 500 comprising exemplary operations 502 through 510.

At 502, a request may be generated based on an input from another unit. In accordance with an embodiment, one or more circuits in the second RF device 104 may be configured to generate the request based on an input from a noise detection unit. The noise detection unit may be configured to detect a presence of noise that exceeds a threshold level.

At 504, one or more reflector devices may be located to transmit the generated request and associated metadata. In accordance with an embodiment, the second RF device 104 may be configured to locate the one or more reflector devices 106, based on various methods, systems, or techniques, as described in FIG. 1.

At 506, the generated request an associated metadata may be transmitted to the located one or more reflector devices. In accordance with an embodiment, the second RF device 104 may be configured to transmit the generated request and associated metadata to the one or more reflector devices 106 via the first antenna array 302A.

At 508, a plurality of beams of RF signals may be received. In accordance with an embodiment, the second RF device 104 may receive the plurality of beams from the one or more reflector devices 106 via the second antenna array 302B. In accordance with an embodiment, the second antenna array 302B may be configured to receive a beam of RF signals from only the first programmable AR device 108. In accordance with another embodiment, the second antenna array 302B may be configured to receive a plurality of beams of RF signals from the multiple reflector devices.

At 510, the received plurality of beams of RF signals may be combined for signal cancellation. In accordance with an embodiment, the programmable antenna 304 in the second antenna array 302B, in conjunction with similar one or more programmable antennas as described in FIG. 2, may be configured to combine the received plurality of beams of RF signals, and based on destructive interference, generate a null space in the specified direction and the specified location of the second RF device 104.

Various embodiments of the disclosure may provide a non-transitory computer-readable medium having stored thereon, computer implemented instruction that when executed by a programmable active reflector (AR) device associated with a first radio frequency (RF) device and a second RF device in an RF device network, execute operations in the programmable AR device, such as first programmable AR device 108, may receive a request and associated metadata from the second RF device, such as second RF device 104, via a first antenna array. Based on the received request and associated metadata, one or more antenna control signals may be received from the first RF device, such as the first RF device 102. The programmable AR device may be dynamically selected and controlled by the first RF device based on a set of criteria. A controlled plurality of RF signals may be transmitted, via a second antenna array, to the second RF device within a transmission range of the programmable AR device based on the associated metadata. The controlled plurality of RF signals may be cancelled at the second RF device based on the associated metadata.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU" or processor), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A system, comprising:
one or more circuits in a programmable active reflector (AR) device associated with a first radio frequency (RF) device and a second RF device, wherein the one or more circuits are configured to:
receive a request and associated metadata from the second RF device via a receiver antenna array, wherein the request is based on a noise generated by the second RF device;
receive one or more antenna control signals from the first RF device based on the received request and associated metadata;
generate a plurality of controlled RF signal based on the received one or more antenna control signals; and
transmit, via a transmitter antenna array, the generated plurality of controlled RF signals based on the associated metadata to the second RF device within a transmission range of the programmable AR device, wherein the plurality of controlled RF signals are cancelled at the second RF device based on the associated metadata.

2. The system according to claim 1, wherein the associated metadata comprises at least a specified direction and a specified location of the second RF device.

3. The system according to claim 2, the one or more circuits are further configured to generate a null space in the specified direction and the specified location based on destructive interference of the plurality of controlled RF signals,
wherein the null space in the specified direction and the specified location is generated based on the associated metadata.

4. The system according to claim 2, wherein the cancellation of the plurality of controlled RF signals in the specified direction and at the specified location of the second RF device corresponds to phase cancellation of the plurality of controlled RF signals.

5. The system according to claim 1, wherein the one or more circuits are further configured to perform beam forming and beam steering to generate the plurality of controlled RF signals based on adjustment of one or more signal parameters on an inbound plurality of RF signals.

6. The system according to claim 1, wherein the programmable AR device is selected from a plurality of programmable AR devices, and controlled by the first RF device based on a set of criteria, and
wherein the set of criteria for the control of the programmable AR device corresponds to at least one of a location of the programmable AR device, a relative distance of the programmable AR device with respect to the second RF device, a type of one or more physical obstructing objects, and one or more parameters measured at the programmable AR device, wherein the one or more parameters correspond to at least an antenna gain, a signal-to-noise ratio (SNR), a signal-to-interference-plus-noise ratio (SINR), a carrier-to-noise (CNR), or a carrier-to-interference-and-noise ratio (CINR).

7. The system according to claim 1, wherein the plurality of controlled RF signals comprises one or more beams of RF signals.

8. The system according to claim 1, wherein the receiver antenna array and the transmitter antenna array are isolated based on dual-polarization.

9. The system according to claim 1, wherein the programmable AR device is integrated in a package of a plurality of antenna modules.

10. The system according to claim 1, wherein the programmable AR device is on a printed circuit board on which a plurality of antenna modules of the programmable AR device is mounted.

11. A non-transitory computer-readable medium having stored thereon, computer executable instructions, which when executed by a computer, cause the computer to execute operations, the operations comprising:
in a programmable active reflector (AR) device associated with a first radio frequency (RF) device and a second RF device:
receiving a request and associated metadata from the second RF device via a first antenna array, wherein the request is based on a noise from the second RF device;
receiving one or more antenna control signals from the first RF device based on the received request and associated metadata;
generating a plurality of controlled RF signal based on the received one or more antenna control signals; and
transmitting, via a second antenna array, the generated plurality of controlled RF signals based on the associated metadata to the second RF device within a transmission range of the programmable AR device, wherein the plurality of controlled RF signals are cancelled at the second RF device based on the associated metadata.

12. The non-transitory computer-readable medium according to claim 11, wherein the first antenna array and the second antenna array are isolated based on dual-polarization.

13. The non-transitory computer-readable medium according to claim 11, wherein the associated metadata comprises at least a specified direction and a specified location of the second RF device.

14. The non-transitory computer-readable medium according to claim 13, the operations further comprising generating a null space in the specified direction and the specified location based on destructive interference of the plurality of controlled RF signals,
wherein the null space in the specified direction and the specified location is generated based on the associated metadata.

15. The non-transitory computer-readable medium according to claim 13, wherein the cancellation of the plurality of controlled RF signals in the specified direction and at the specified location of the second RF device corresponds to phase cancellation of the plurality of controlled RF signals.

16. The non-transitory computer-readable medium according to claim 11, wherein the operations further comprising beam forming and beam steering to generate the plurality of controlled RF signal, based on adjustment of one or more signal parameters on an inbound plurality of RF signals.

17. The non-transitory computer-readable medium according to claim 11, wherein the programmable AR device is integrated in a package of a plurality of antenna modules.

* * * * *